United States Patent [19]

Lesartre

[11] Patent Number: 5,761,713

[45] Date of Patent: Jun. 2, 1998

[54] ADDRESS AGGREGATION SYSTEM AND METHOD FOR INCREASING THROUGHPUT TO A MULTI-BANKED DATA CACHE FROM A PROCESSOR BY CONCURRENTLY FORWARDING AN ADDRESS TO EACH BANK

[75] Inventor: Gregg Lesartre, Fort Collins, Colo.

[73] Assignee: Hewlett-Packard Co., Palo Alto, Calif.

[21] Appl. No.: 609,821

[22] Filed: Mar. 1, 1996

[51] Int. Cl.$^6$ .................................... G06F 12/00
[52] U.S. Cl. .................... 711/127; 711/126; 711/800.23; 711/800.41
[58] Field of Search .................... 395/453, 452, 395/454, 800, 800.23, 800.41; 84/603; 711/125, 126, 127

[56] References Cited

U.S. PATENT DOCUMENTS

| | | | |
|---|---|---|---|
| 3,699,533 | 10/1972 | Hunter | 364/243 |
| 4,381,541 | 4/1983 | Basmann, Jr. et al. | 711/128 |
| 4,439,827 | 3/1984 | Wilkes | 395/582 |
| 4,724,518 | 2/1988 | Steps | 395/454 |
| 4,818,932 | 4/1989 | Odenheimer | 324/121 R |
| 4,918,587 | 4/1990 | Pechter et al. | 395/421.08 |
| 5,342,990 | 8/1994 | Rossum | 84/603 |
| 5,420,997 | 5/1995 | Browning et al. | 711/211 |
| 5,434,989 | 7/1995 | Yamaguchi | 395/403 |
| 5,467,473 | 11/1995 | Kahle et al. | 395/800 |
| 5,506,957 | 4/1996 | Fry et al. | 395/182.07 |
| 5,557,768 | 9/1996 | Braceras et al. | 395/458 |
| 5,559,986 | 9/1996 | Alpert et al. | 395/471 |
| 5,594,884 | 1/1997 | Matoba et al. | 395/452 |

FOREIGN PATENT DOCUMENTS

| | | |
|---|---|---|
| 0055579A | 12/1981 | European Pat. Off. |
| 0365281A | 10/1989 | European Pat. Off. |
| 2277181A | 12/1992 | United Kingdom |

OTHER PUBLICATIONS

Johnson, Mike, Superscalar Microprocessor Design, Prentice Hall, 1991, pp. 127–163, 1991.

Boleyn et al., "A Split Data Cache for Superscalar Processors," Computer Design: VLSI in Computers and Processors, Proceedings 1993 IEEE International Conference on, pp. 32–39, 1993.

Wolfe et al., "Two–ported Cache Alternatives for Superscalar Processors," Microarchitecture, Proceedings of the 26th Annual International Symposium on, pp. 41–48, 1993.

Kato et al., "Data Cache Architecture of the Superscalar by Scheduling Patterns," System Sciences, Proceeding of the Twenty–Sixth Hawaii International Conference on, vol. 2, pp. 219–220, 1993.

*Primary Examiner*—Tod R. Swann
*Assistant Examiner*—Christopher S. Chow

[57] ABSTRACT

An address aggregation system enhances the performance of a processor that executes instructions out of order by enhancing the throughput of data addressing from the processor to a remote data cache (DCACHE). In essence, the processor is configured to concurrently address separate independent DCACHE banks, each preferably an inexpensive single ported random access memory (RAM), during each processor cycle. In the preferred implementation, the DCACHE has odd and even banks that are addressed by respective odd and even data addresses during each processor cycle. The processor comprises an instruction cache (ICACHE), an instruction fetch mechanism (IFETCH) for retrieving instructions from the ICACHE, a sort mechanism (SORT) for receiving instructions from the IFETCH and for sorting the instructions into arithmetic instructions and memory instructions, and a memory queue (MQUEUE) for receiving the memory instructions from the sort and permitting the instructions to execute out of order. The MQUEUE includes a plurality of address reorder buffer slots (ARBSLOTs), an odd bank arbitrator, and an even bank arbitrator. Each of the ARBSLOTs maintains an address, determines whether the address is odd or even, and generates a respective odd or even request depending upon whether the address is odd or even. The odd and even bank arbitrators receive the requests associated with the odd and even addresses respectively and control the ARBSLOTS to output data to the DCACHE.

19 Claims, 8 Drawing Sheets

ADDRESS AGGREGATION SYSTEM AND METHOD FOR INCREASING THROUGHPUT TO A MULTI-BANKED DATA CACHE FROM A PROCESSOR BY CONCURRENTLY FORWARDING AN ADDRESS TO EACH BANK

FIELD OF THE INVENTION

The present invention generally relates to computer processor architectures, and more particularly, to an address aggregation system and method for increasing throughput of addresses to a data cache from a processor that executes instructions out of order, to thereby enhance performance.

BACKGROUND OF THE INVENTION

A computer processor (processing unit) generally comprises a control unit, which directs the operation of the system, and an arithmetic logic unit (ALU), which performs computational operations. The design of a processor involves the selection of a register set(s), communication passages between these registers, and a means of directing and controlling how these operate. Normally, a processor is directed by a program, which consists of a series of instructions that are kept in a main memory. Each instruction is a group of bits, usually one or more words in length, specifying an operation to be carried out by the processor. In general, the basic cycle of a processor comprises the following steps: (a) fetch an instruction from main memory into an instruction register; (b) decode the instruction (i.e., determine what it indicates should be done; each instruction indicates an operation to be performed and the data to which the operation should be applied); (c) carry out the operation specified by the instruction; and (d) determine where the next instruction is located. Normally, the next instruction is the one immediately following the current one.

However, in high performance processors, such as superscalar processors where two or more scaler operations are performed in parallel, the processor may be designed to perform instructions that are out of order, or in an order that is not consistent with that defined by the software driving the processor. In these systems, instructions are executed when they can be executed, as opposed to when they appear in the sequence defined by the program. Moreover, after execution of out of order instructions, the results are ultimately reordered to correspond with the instruction order.

A cache memory is often employed in association with a processor in a computer in order to optimize performance. A cache memory is a fast buffer located between the processor and the main memory of the computer. Data and instructions in current use in the processor are moved into the cache memory, thereby producing two benefits. First, the average access time for the processor's memory requests are reduced, increasing the processor's throughput. Second, the processor's utilization of the available memory bandwidth is thereby reduced, allowing other devices on the system bus to use the memory without interfering with the processor. A cache memory is thus used to speed up the flow of instructions and data into the processor from the main memory. This cache function is important because the main memory cycle time is typically slower than processor clocking rates.

When a processor accesses a data cache for a data line, the processor forwards an address to the cache. The cache parses a cache index from the address and uses it to select a storage location(s) that may contain the desired data line. The cache outputs a tag, which is a real page number (RPN) in some designs, corresponding with the location(s) and a status indicator, which indicates whether the data line corresponding with the tag is valid or invalid.

Support circuitry, typically associated with the cache, receives the status indicator and the tag. When the status indicator indicates invalid data, then the support circuitry forwards a "miss" indication to the processor, in which case the processor must access the main memory for the data line. When the status indicator indicates valid data, the support circuitry compares the tag with the remainder of the address in order to determine if the cache is currently storing the desired data line. When the cache does not have the data line being requested as determined by the tag comparison, then the support circuitry forwards a "miss" indication to the processor, in which case the processor must access the main memory for the data line. When the cache does have the data line being requested as determined by the tag comparison, then the support circuitry forwards a "hit" indication to the processor, which prompts the processor to read the requested data line.

In processors that perform out of order execution of instructions, it is desirable to make multiple simultaneous accesses to the data cache to enhance throughput from the processor to the cache memory and overall speed of the processor. It would be possible to utilize a cache memory having multiple ports, one corresponding with each access to the cache memory. However, this solution is undesirable as these cache designs are costly and not suitable for mass production of inexpensive processors and computers implementing large off-chip caches.

SUMMARY OF THE INVENTION

An object of the present invention is to overcome the inadequacies and deficiencies of the prior art as discussed above in the background section.

Another object of the present invention is to improve the performance of processors that execute instructions out of order.

Another object of the present invention is to provide a system and method for inexpensively implementing multiple accesses to a data cache (DCACHE) associated with a processor of a computer.

Another object of the present invention is to provide a system and method for increasing the efficiency of addressing of a DCACHE by a processor and data transfers from the DCACHE to the processor.

Another object of the present invention is to provide a system and method for increasing throughput of data from a DCACHE to an associated processor, while ensuring reliability.

Briefly described, the present invention provides for an address aggregation system that enhances the performance of a processor that executes instructions out of order by maximizing the usage of read ports of a DCACHE associated with the processor. In essence, the processor is configured to forward a plurality of addresses generated by instructions in an instruction reordering mechanism, for example, a memory queue (MQUEUE), to respective cache banks made from corresponding single ported storage devices, such as a random access memory (RAM). In the preferred embodiment, an odd memory address and an even memory address are concurrently forwarded to the DCACHE during each cycle.

In architecture, the processor comprises an instruction cache (ICACHE), an instruction fetch mechanism (IFETCH) for retrieving instructions from the ICACHE, a sort mechanism for receiving instructions from the IFETCH and for sorting the instructions into arithmetic instructions and memory instructions, and a reordering mechanism, such as the MQUEUE, for receiving the memory instructions from the sort mechanism and permitting the instructions to execute out of order. The MQUEUE includes a plurality of address reorder buffer slots (ARBSLOTs), an odd bank arbitrator, and an even bank arbitrator. Each of the ARBSLOTs maintains an address, determines whether the address is either odd or even, and generates either a respective odd or even requests depending upon whether the address is either odd or even. The odd and even bank arbitrators receive the requests associated with the odd and even addresses respectively and control the slots to output addresses to the cache.

The invention can also be viewed as providing a novel method for processing data addresses in a processor and increasing throughput of the data addresses to a data cache from the processor. The method, as broadly conceptualized, comprises the following steps: maintaining a plurality of independent banks in the cache; collecting data addresses in the processor; allocating each of the data addresses to a particular one of the banks; and communicating an address to each of the banks during a single cycle of the processor.

Other objects, features, and advantages of the present invention will become apparent to one of skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. In the drawings, the schematic illustrations of the various components therein are not necessarily to scale, emphasis instead being placed upon clearly illustrating principles of the invention. Furthermore, like reference numerals designate corresponding parts throughout the several views.

FIGS. 5A-5F illustrate block diagrams showing a possible implementation of the arbitrators of FIG. 3; more specifically.

DETAILED DESCRIPTION OF THE PREFERRED EMBODIMENT

Figure 1:
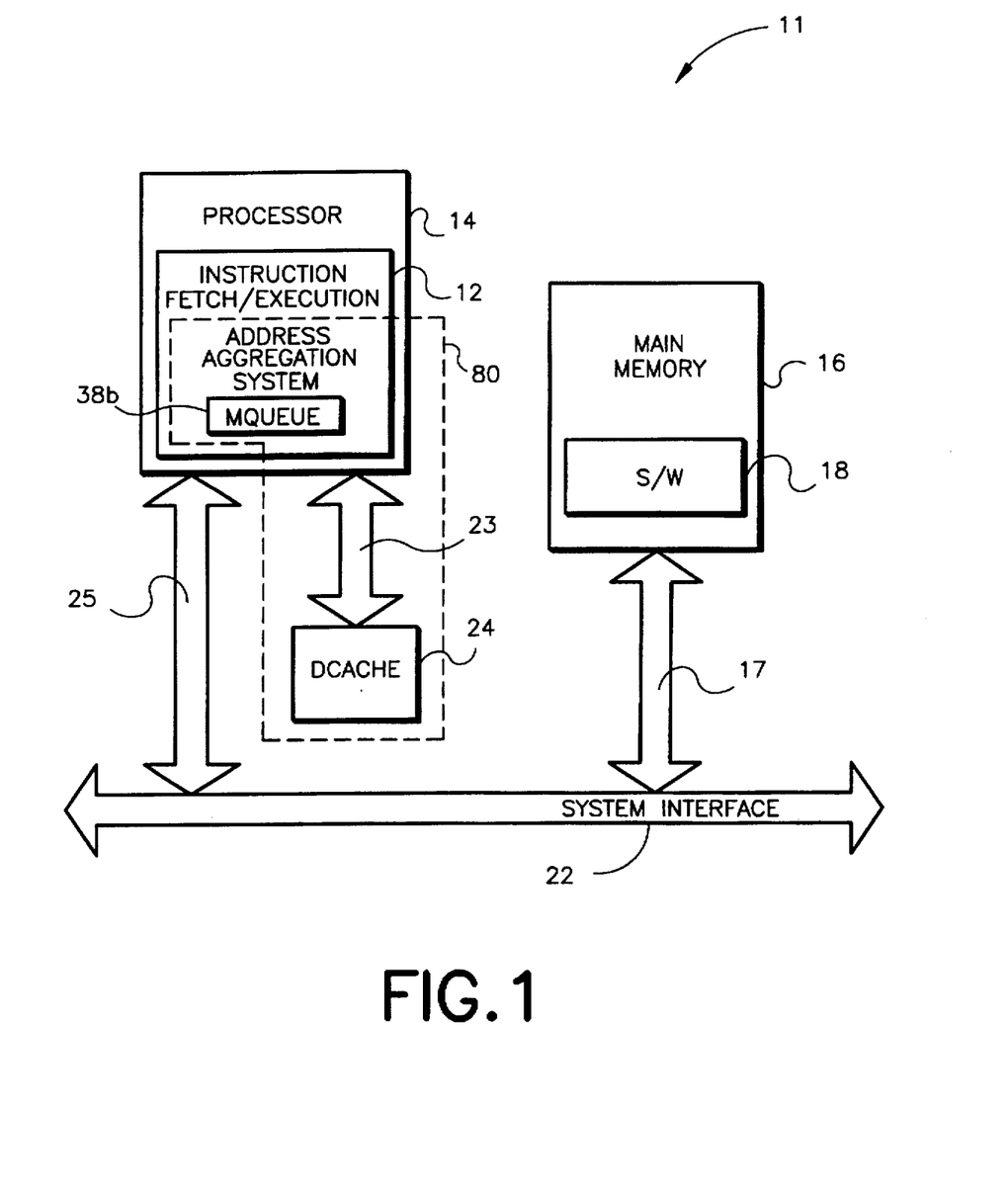
FIG. 1 is a block diagram showing a computer implementing the address aggregation system of the present invention.

As shown in FIG. 1, the address aggregation system 80 (see FIG. 3 for more details) and associated methodology of the present invention is implemented within a computer 11, and particularly, in connection with a memory queue (MQUEUE) 38b of an instruction fetch/execution system 12 within a processor 14 and in connection with a data cache (DCACHE) 24 connected to the processor 14 of the computer 11. The computer 11 generally comprises the processor 14, a main memory 16 having software (SIW) 18 for driving the processor 14, the DCACHE 24 in the form of single ported storage devices, such as random access memories (RAMs), interconnected with the processor 14 as indicated by reference arrow 23, and a system interface 22, such as one or more buses, interconnecting the processor 14 and the main memory 16. In operation, as the instruction fetch/execution system 12 in the processor 14 executes the software 18, data that is in current use in the processor 14 is moved into the DCACHE 24 under the control of instructions in the MQUEUE 38b, thereby reducing the average access time for the processor's memory requests and minimizing traffic on the system interface 22. Finally, it should be mentioned that, with the exception of the novel address aggregation system 80, all of the aforementioned computer components and their interactions are well known and understood in the art.

A typical cache line in the DCACHE 24 includes a tag, a status indicator, and data. A cache index is forwarded to the DCACHE 24 and is used by the DCACHE 24 to select a storage location(s) that may contain the desired data line. In response to receipt of a cache index, the DCACHE 24 outputs a tag, which is a real page number (RPN) in the preferred embodiment, corresponding with the location(s), a status indicator, which indicates whether the data line corresponding with the tag is valid or invalid, and data, which may be valid or invalid. Typically, the status indicator indicates the following states: "invalid," which means that no data is present; "valid shared," which means that data is present, but may be also located elsewhere; "valid private clean," which means that the line has the sole copy and the DCACHE 24 has not yet written to the line; and "valid private dirty," which means that the line has the sole copy and that the DCACHE 24 has written to the line (and thus needs to copy the line to main memory 16.

A tag compare mechanism (not shown) associated with the DCACHE 24, receives the status indicator and the tag. When the status indicator indicates invalid data, then the tag compare mechanism forwards a "miss" indication to the processor 14, in which case the processor 14 accesses the main memory 16 for the data line. When the status indicator indicates valid data, the tag compare mechanism compares the tag with the remainder of the address in order to determine if the DCACHE 24 is currently storing the desired data line. When the DCACHE 24 does not have the data line being requested as determined by the tag comparison, then the tag compare mechanism forwards a "miss" indication to the processor 14, in which case the processor 14 accesses the main memory 16 for the data line. When the DCACHE 24 does have the data line being requested as determined by the tag comparison, then the tag compare mechanism forwards a "hit" indication to the processor 14, which prompts the processor 14 to read the requested data line.

Figure 2:
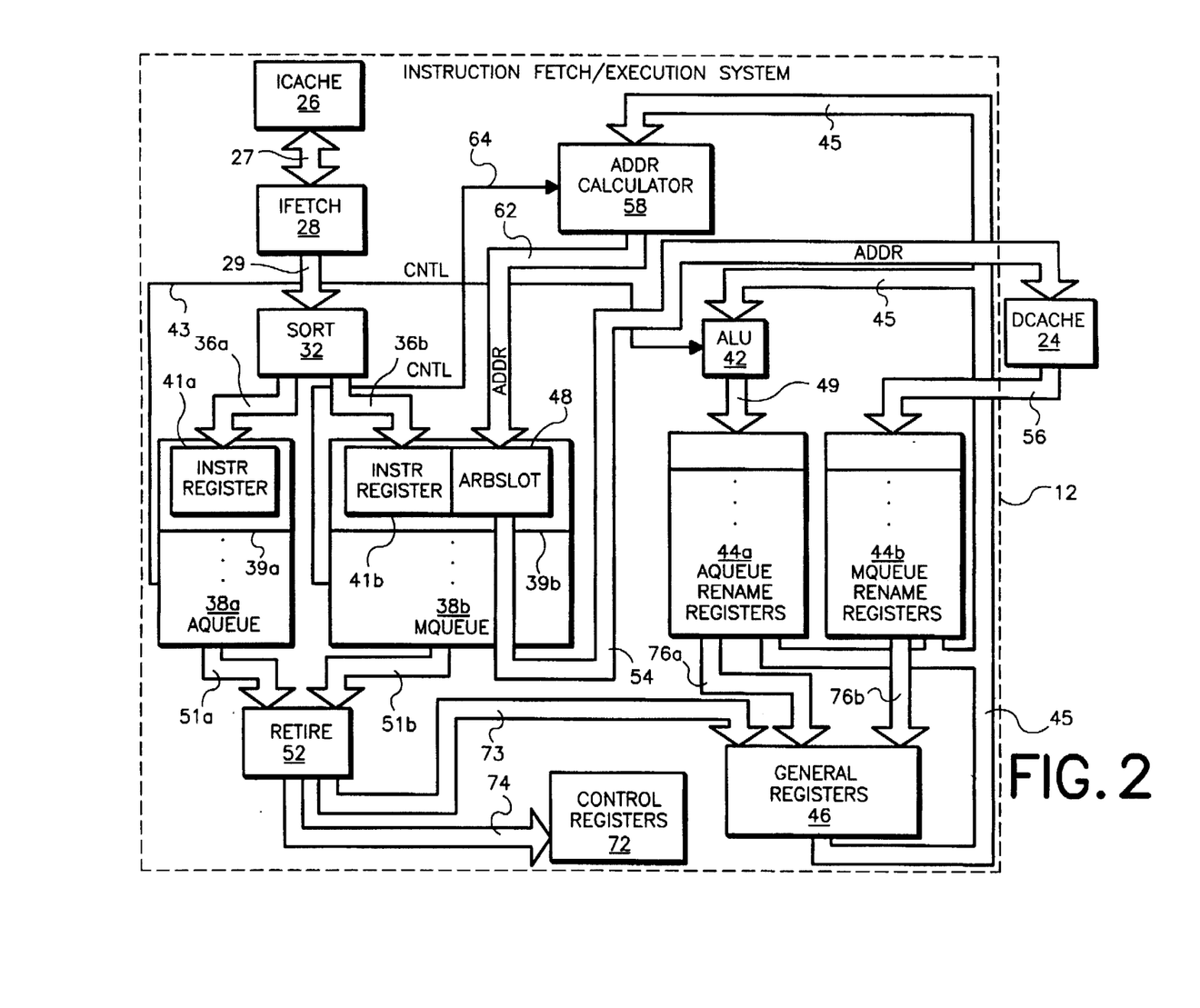
FIG. 2 is a block diagram showing a possible implementation of an instruction fetch/execution system in a processor of FIG. 1 and its relationship to a data cache (DCACHE) associated with the processor of FIG. 1.

A possible implementation of the instruction fetch/execution system 12 is illustrated by way of block diagram in FIG. 2. As shown in FIG. 2, the instruction fetch/execution system 12 has an instruction cache (ICACHE) 26 for storing instructions from the software 18 (FIG. 1). An instruction fetch mechanism (IFETCH) 28 communicates with the ICACHE 26 and retrieves instructions from the ICACHE 26 for ultimate execution. In the preferred embodiment, the IFETCH 28 fetches four instructions (each 32 bits) at a time and transfers the instructions to a sort mechanism 32.

The sort mechanism 32 determines whether each instruction is destined for an arithmetic logic unit (ALU) or the memory and distributes the instructions accordingly into an arithmetic logic unit queue (AQUEUE) 38a and the MQUEUE 38b, respectively, as indicated by corresponding reference arrows 36a, 36b.

The AQUEUE 38a contains ALU instruction processing mechanisms 39a (in the preferred embodiment, there are 28 in number) that have registers 41a for storing respective instructions that are directed to an arithmetic logic unit 42, as indicated by reference arrow 43. The instructions in the AQUEUE 38a are executed in any order possible (preferably, in data flow fashion), and as they complete, the results are captured and marked complete.

The ALU 42, under the control of the AQUEUE 38a, can retrieve operands from rename registers 44a, 44b and general registers 46, as is indicated by interface 45. After the ALU 42 operates on the operands, the results of the operation are stored in the AQUEUE rename registers 44a, as delineated by reference arrow 49.

The MQUEUE 38b contains instruction processing mechanisms 39b. Each instruction processing mechanism 39b includes a register 41b for storing a respective memory instruction and includes an address reorder buffer slot (ARBSLOT; in the preferred embodiment, there are 28 in number), denoted by reference numeral 48, for storing a respective address. Memory instructions in the MQUEUE 38b can be classified as "loads" and "stores" to memory. A "load" is a request to transfer data from memory (DCACHE 24 or main memory 16) to a register, whereas a "store" is a request to transfer data from a register to memory.

During execution of an instruction, a first phase involves executing a prescribed mathematical operation on operands in order to compute an address, and a second phase involves accessing the memory/cache for data based upon the calculated address. The MQUEUE 38b executes each of the instructions and the two phases (address computation and memory/cache access) of execution in any order possible (preferably, in data flow fashion). As the instructions complete, the results are captured by the MQUEUE rename registers 44b and the instruction is marked as complete in the MQUEUE 38b. In the preferred embodiment, the MQUEUE 38b receives up to four instructions (32 bits each) per cycle from the sort mechanism 32 and transfers up to two instructions (32 bits) per cycle to a retire mechanism 52, as indicated by reference arrow 51b.

More specifically, during the first phase of instruction execution, an address is generated by an address calculator 58. The address calculator 58 computes the address based upon operands retrieved from the rename registers 44b and passes the address (real or virtual) to an ARBSLOT 48 corresponding to the instruction in the MQUEUE 38b, as indicated by reference arrow 62. Control of the calculation by the instruction is indicated by the reference arrow 64 in FIG. 2. When the second phase of memory instruction execution is pursued, the calculated address (including a cache index) is transferred to the DCACHE 24, as indicated by the reference arrow 54, to accomplish a load or a store at the DCACHE 24. In the preferred embodiment, two addresses are transferred each cycle, if possible, from the MQUEUE 38b to the DCACHE 24. Once the DCACHE 24 processes the address, the data results are transferred to the rename registers 44b, as indicated by reference arrow 56.

The retire mechanism 52 receives executed instructions (preferably, two 32-bit words per cycle) from each of the queues 38a, 38b, as indicated by reference arrows 51a, 51b. The retire mechanism 52 commits the instruction results to the architecture state. The software 18 (FIG. 1) is not made aware of any results that are not transformed to the architecture state by the retire mechanism 52. The retire mechanism 52 retires the instructions in the queues 38a, 38b in the program order defined by the software 18 by moving the instruction results to a general register 46 and/or a control register 72, as indicated by respective reference arrows 73, 74, depending upon the instruction's attributes, and causes the results of the instruction to be passed from the rename registers 44a, 44b to the general registers 46, as indicated by the reference arrows 76a, 76b.

When the retire mechanism 52 retires an instruction that resulted in a store to a data line in the DCACHE 24, the retire mechanism 52 forwards the data line to the DCACHE 24 and marks the status indicator corresponding with the line as "dirty," to indicate that the line has changed and should ultimately be forwarded to the main memory 16 for updating the line at the main memory 16.

The retire mechanism 52 also has logic for determining whether there is an exception associated with an instruction. An exception is a flag that indicates a special circumstance corresponding with one of the currently retiring instructions. In the event of an exception, the retire mechanism 52 discards all instructions within the queues 38a, 38b that follow the instruction that indicated the exception and causes the IFETCH 28 to retrieve once again the instructions at issue for re-execution or to retrieved special software to handle the special circumstance.

Address Aggregation System And Method

The address aggregation system 80 of the present invention will now be described with reference to FIG. 3. In accordance with the address aggregation system, the processor 14 is configured to forward a plurality of addresses to respective cache banks in corresponding single-ported storage devices that form the DCACHE 24. In the preferred embodiment, an odd memory address and an even memory address are concurrently forwarded to respective odd and even cache banks of the DCACHE during each cycle.

Figure 3:
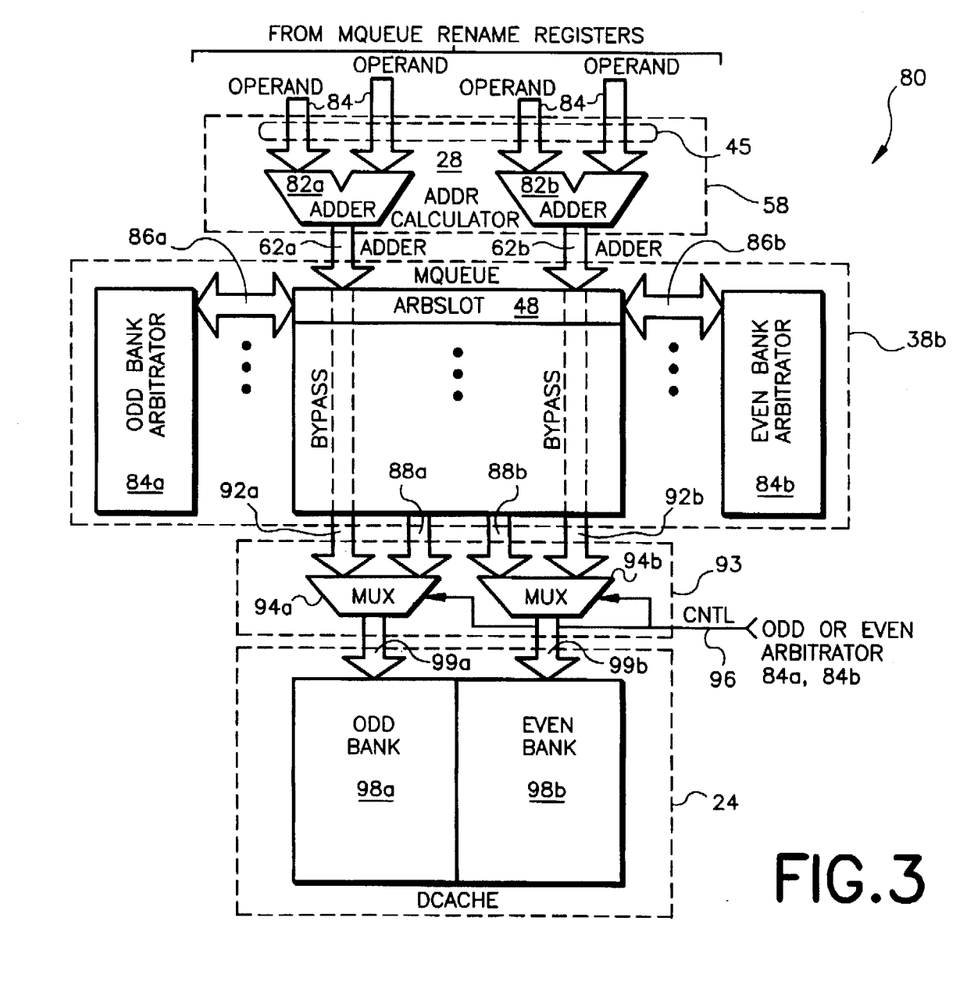
FIG. 3 is a block diagram showing a possible implementation of the novel address aggregation system of FIG. 1.

The address aggregation system 80 is implemented by way of resources primarily situated in the MQUEUE 38b, as indicated in FIG. 3. The address calculator 28 involves adders 82a, 82b, each of which receives two input operands 84 (reference arrow 45 in FIG. 1) from the rename registers 44b. The adders 82a, 82b operate upon their respective input operands 84 and generate addresses 62a, 62b, respectively.

The MQUEUE 38b, as constructed pursuant to the invention, includes a plurality of ARBSLOTs 48, one for storing each address. There are 28 ARBSLOTs 48 in the preferred embodiment; however, any number could be employed. An odd bank arbitrator 84a and an even bank arbitrator 84b are both in communication with each of the ARBSLOTs 48, as indicated by respective arrows 86a, 86b. Typically, two addresses are forwarded by the MQUEUE 38b to the DCACHE 24 during each cycle, one being odd and the other being even in the preferred embodiment. The odd and even addresses are output from respective ARBSLOTs 48, as indicated by reference arrows 88a, 88b, or are output from bypass paths 92a, 92b, respectively. The bypass paths 92a, 92b essentially forward the addresses on respective inputs 62a, 62b directly to the DCACHE 24, when controlled to do so. The bypass paths 92a, 92b are utilized when no valid address (for either the odd or even cache port) is ready to be transferred to the DCACHE 24 so that cycles are not wasted and high performance is achieved.

Each instruction in the MQUEUE 38b calculates its address once its dependencies have cleared. Once an address has been calculated, the instruction indicates this status and requests the MQUEUE 38b to be launched to the DCACHE 24. The arbitration logic, either the odd bank arbitrator 84a or the even bank arbitrator 84b depending upon whether the address corresponding with the instruction is either odd or even, decides when and whether to launch the address to the DCACHE 24. The corresponding arbitrator 84a, 84b selects the oldest address (either odd or even) and launches the oldest.

The instructions of the MQUEUE 38b execute out of order as operands become available. Accordingly, addresses are calculated out of order and the addresses received by the MQUEUE 38b may be out of order. However, the order of the addresses that are sent from the MQUEUE 38b to the DCACHE 24 are prioritized by the order dictated by the software 18 (FIG. 1). This implementation results in a performance advantage because priority is given to the oldest instruction, and the configuration optimally interfaces addresses to the software 18 (FIG. 1).

As further illustrated in FIG. 3, a multiplexer mechanism 93 handles the direct and bypass paths from the MQUEUE 38b. The multiplexer mechanism 93 includes multiplexers (MUX) 94a, 94b, which receive respective addresses 88a, 92a and 88b, 92b from the MQUEUE 38b. In essence, the multiplexers 94a, 94b control whether an address is communicated from the ARBSLOTs 48 to the DCACHE 24, or alternatively, whether an address is communicated from the bypass paths 92a, 92b to the DCACHE 24. The multiplexers 94a, 94b are controlled by the odd or even arbitrator 84a, 84b, as indicated by reference arrow 96. The multiplexers 94a, 94b transfer a selected address to respective odd and even banks 98a, 98b, as indicated by reference arrows 99a, 99b. An odd address and an even address are transferred to the DCACHE 24 during a single cycle in the typical operation. Occasionally, only either an odd or an even address is available, in which case only the single odd or even address is transferred to the DCACHE 24 during that particular cycle. However, the foregoing scenario is rare. Finally, the multiplexers 94a, 94b are controlled to select the bypass paths 92a, 92b when no ARBSLOT 48 requests the port of the DCACHE 24.

Figure 4:
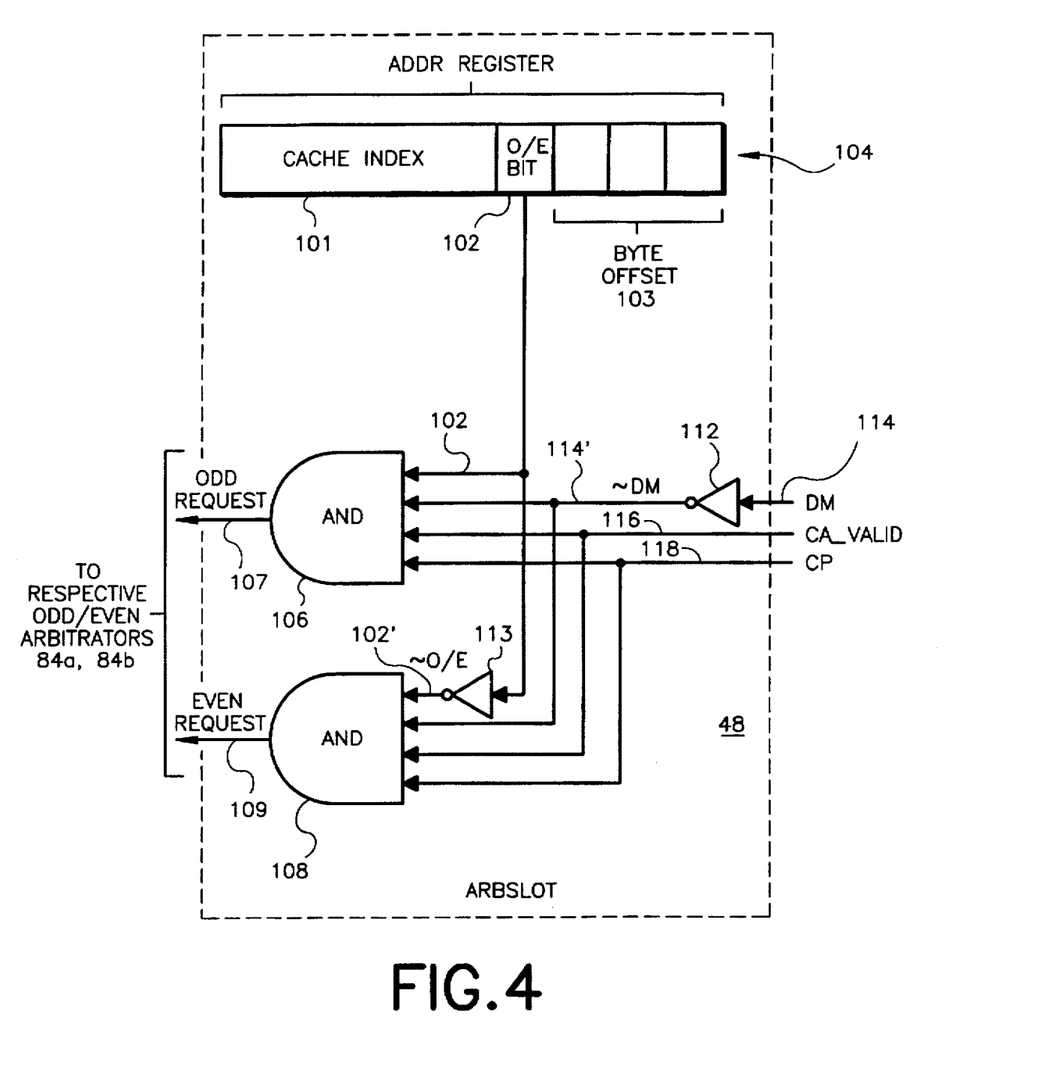
FIG. 4 is a schematic diagram showing a possible implementation of logic in each address reorder buffer slot (ARBSLOT) of FIG. 3 in order to sort addresses into odd and even sets.

The logic associated with each ARBSLOT 48 for sorting the addresses into odd and even sets and generating requests for the arbitrators 84a, 84b is set forth in FIG. 4. With reference to FIG. 4, each address is stored in an ARBSLOT register 104. Each address includes a cache index 101 for accessing the DCACHE 24, an odd/even (O/E) bit(s) 102, and a plurality of bits 103 constituting the byte offset relative to the DCACHE 24. The byte offset 103 is typically ignored when the cache is accessed. The foregoing elements are successive in the preferred embodiment.

Each ARBSLOT 48 examines the O/E bit 102 in the register 104 and receives the inverse (~DM) of a dependent-on-miss (DM) input 114, a cache address valid input (CA_VALID) 116, and a cache pending input (CP) 118 in order to derive an odd request 107 for arbitrator 84a, an even request 109 for arbitrator 84b, or neither. In terms of architecture, the logic of the ARBSLOT 48 includes an inverter 112 for producing ~DM from the DM input, and inverter 113 for producing ~O/E from the O/E bit 102, an AND logic 106 for generating an odd request, an AND logic 108 for generating an even request 109. The odd and even requests 107, 109 are forwarded to the respective odd and even arbitrators 84a, 84b (FIG. 3).

The inputs to the AND logic 106 are the O/E bit 102, the signal ~DM 114', the signal CA_VALID 116 indicating whether or not this ARBSLOT 48 contains a valid address, and the signal CP 118 indicating whether or not the address needs to be sent to the DCACHE 24. Both signals CA_VALID 116 and CP 118 should be asserted in order for a request 107, 109 to be generated. The DM input 114 is asserted (~DM deasserted) when the ARBSLOT 48 currently needs data that is not in the DCACHE 24, but has already been requested from the main memory 16 (FIG. 1). All ARBSLOTs 48 that are dependent on this miss data are fed with an asserted DM input 114 so that the corresponding ARBSLOTS 48 refrain from requesting data from the main memory 16. As an example, circuitry that can be utilized to generate the DM input 114 is described in detail in copending application entitled, "Miss Tracking System And Method", filed the same day as the instant application, by the inventer herein. The foregoing disclosure is incorporated herein by reference as if set forth in full hereinbelow.

The AND logic 108, which generates the even request 109, receives the ~O/E 102, the ~DM 114', the CA_VALID 116, and the CP 118. When all of the foregoing signals are asserted, the AND logic 108 generates an even request 109 for the even arbitrator 84b.

The specific logic associated with a possible implementation of each of the odd and even bank arbitrators 84a, 84b (FIG. 3) will now be described in detail with reference to FIG. 5. For simplicity, the logic for only one of the arbitrators 84a, 84b is shown in FIGS. 5A–5D and will be described hereafter, but it should be understood that the logic is generally the same for the other.

Figure 5A:
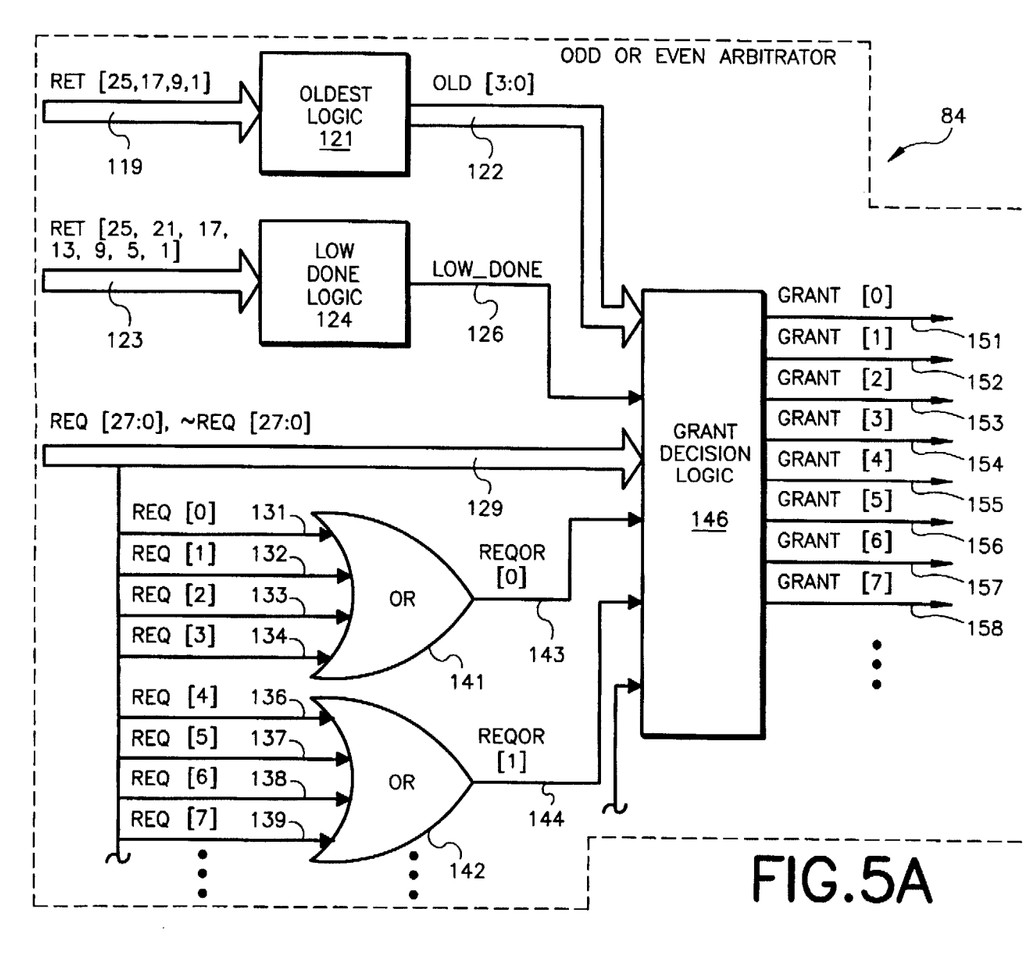
FIG. 5A is a high level block diagram of the overall architecture.

In the preferred embodiment, the arbitrator 84 of FIG. 5A is designed to determine and launch the oldest instruction situated within the MQUEUE 38b. The ARBSLOTs 48 can each provide a single request (one of REQ[27:0]) to each arbitrator 84. From these requests REQ[27:0], the arbitrator 84 (odd or even) grants only a single ARBSLOT 48 (odd or even) the ability to launch its address during each cycle. In this regard, the arbitrator 84 provides GRANT[27:0] to the ARBSLOTs 48, respectively.

In architecture, as shown in FIG. 5A, each arbitrator 84 includes oldest logic 121 for determining the oldest group of eight requests (i.e., one of REQ[27:24], REQ[23:16], REQ[15:8], REQ[7:0]); note that the fourth group has only four, as there are only twenty eight ARBSLOTs 48 and instructions in the preferred embodiment). The oldest logic 121 receives four retire pointers RET[25,17,9,1] and outputs four signals OLD[3:0], one corresponding to each group of eight requests, as indicated by reference arrow 122. The retire pointers RET[27:0] indicate where the next two instructions to retire are located. At any given time, two of the foregoing retire pointers are asserted, thereby indicating the oldest requests REQ[27:0]. In essence, the retire pointers RET[27:0] are generated from a circular shift chain with two latches in the chain containing an asserted variable ("1"), each of which transitions to a deasserted variable ("0") whenever the associated MQUEUE instruction retires.

Low done logic 124 determines whether a first half of the oldest group of requests has completed launching. For example, assume that requests REQ[7:0] are the oldest group. In this scenario, the low done logic 124 determines whether the requests REQ[3:0] have already retired. The low done logic 124 outputs a single signal (LOW_DONE) for indicating this information, as is indicated by reference arrow 126, based upon the input retire pointers RET[25,21,17,13,9,5,1] that are input to it.

Each group of four requests (i.e., REQ[27:24,23:20, 19:16,15:12,11:8,7:4,3:0] is grouped and forwarded to OR logic. For purposes of simplicity, only the first two groups of four requests (REQ[7:4,3:0]) are illustrated in FIG. 5A. As shown, each group of four requests (REQ[7:4,3:0]), denoted by reference numerals 131–134, 136–139, are communicated to respective OR logic 141, 142 to generate corresponding signals REQOR[0], REQOR[1], denoted by reference numerals 143, 144. Hence, the OR operation yields REQOR[6:0]) based upon REQ[27:0]).

Grant decision logic 146 receives the signals OLD[3:0] 122, LOW_DONE 126, REQ[27:0], and REQOR[6:0]. Based upon the logic states of the foregoing signals, the grant decision logic 146 launches an address from one of the ARBSLOTs 48 by asserting one of the corresponding grant signals GRANT[27:0].

Figure 5B:
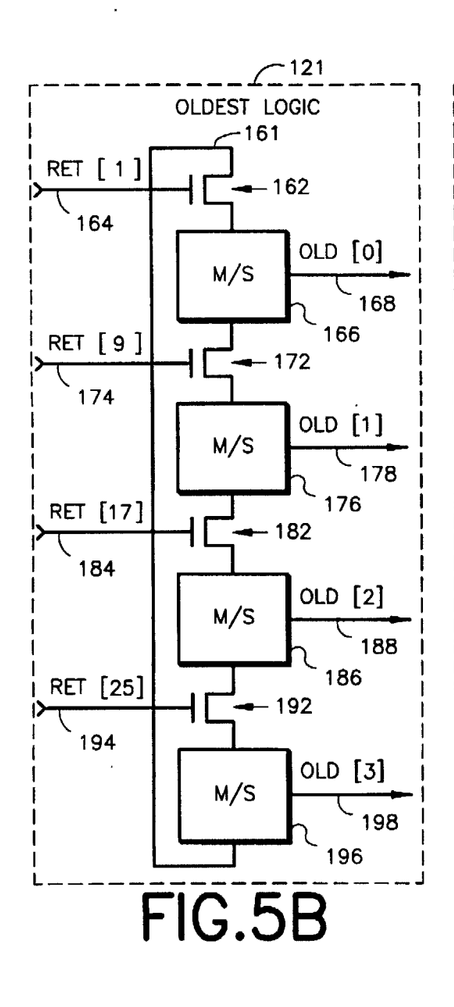
FIG. 5B is a block diagram of the oldest logic of FIG. 5A.

The preferred embodiment of the oldest logic is set forth in FIG. 5B. As shown in FIG. 5B, the oldest logic 121 implements a circular shift chain 161 that sets a bit to indicate which group of eight requests is the oldest based upon the retire pointers RET[25,17,9,1]. The chain 161 includes a transistor 162 actuated by a retire pointer RET[1] 164 and connected to a master/slave latch (M/S) 166, which provides an oldest signal OLD[0] 168; a transistor 172 actuated by a retire pointer RET[9] 174 and connected between the M/S latch 166 and a M/S latch 176, which provides an oldest signal OLD[1] 178; a transistor 182 actuated by a retire pointer RET[17] 184 and connected between the M/S latch 176 and a M/S latch 186, which provides an oldest signal OLD[2] 188; and a transistor 192 actuated by a retire pointer RET[25] 194 and connected between the M/S latch 186 and a M/S latch 196, which generates an oldest signal OLD[3] 198. Recall that the retire pointers [RET[25, 17, 9, 1]), denoted by corresponding reference numerals 164, 174, 184, 194, indicate where the next two instructions to retire are located. At any given time, one of the OLD[3:0] is asserted, thereby indicating the oldest set of eight requests.

Figure 5C:
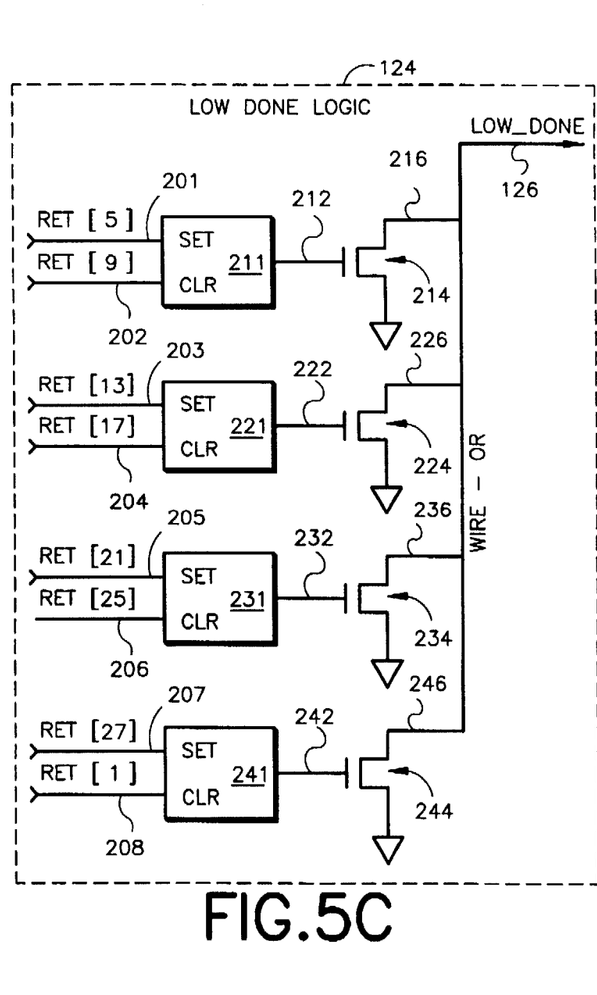
FIG. 5C is a block diagram of the low done logic of FIG. 5A.

The preferred embodiment of the low done logic 124 is shown in FIG. 5C. With reference to FIG. 5C, the low done logic 124 generates the signal LOW_DONE 126 based upon the states of retire pointers RET[29, 25, 21, 17, 13, 9, 5, 1] denoted by respective reference numerals 201–208. The low done logic 124 includes a latch 211, which receives the retire pointers RET[9, 5] 201, 202 at its set and clear (CLR) inputs, respectively, and generates an output 212 that actuates a transistor 214 having its source 216 connected to a wire-OR output 126. A latch 221 receives the retire pointers RET[17, 13] 203, 204 at its set and clear inputs, respectively, and produces an output 222 that actuates a transistor 224 having a source 226 connected to the wire-OR output 126. A latch 231 receives the retire pointers RET[25, 21] 205, 206 at its set and clear inputs, respectively, and produces an output 232 that actuates a transistor 234 having its source 236 connected to the wire-OR output 126. A latch 241 receives the retire pointers RET[27, 1] 207, 208 at its set and clear inputs, respectively, and produces an output 242 which actuates a transistor 244 having its source 246 connected to the wire-OR output 126. By the aforementioned arrangement, the low done logic 124 determines which half in the oldest group of eight has already retired.

It should be noted that it is not necessary to identify the oldest instruction, but only the oldest set of four instructions. This is sufficient because there is always a gap between the oldest instruction and the youngest valid instruction and because this logic does not have to always select the oldest.

Figure 5D:
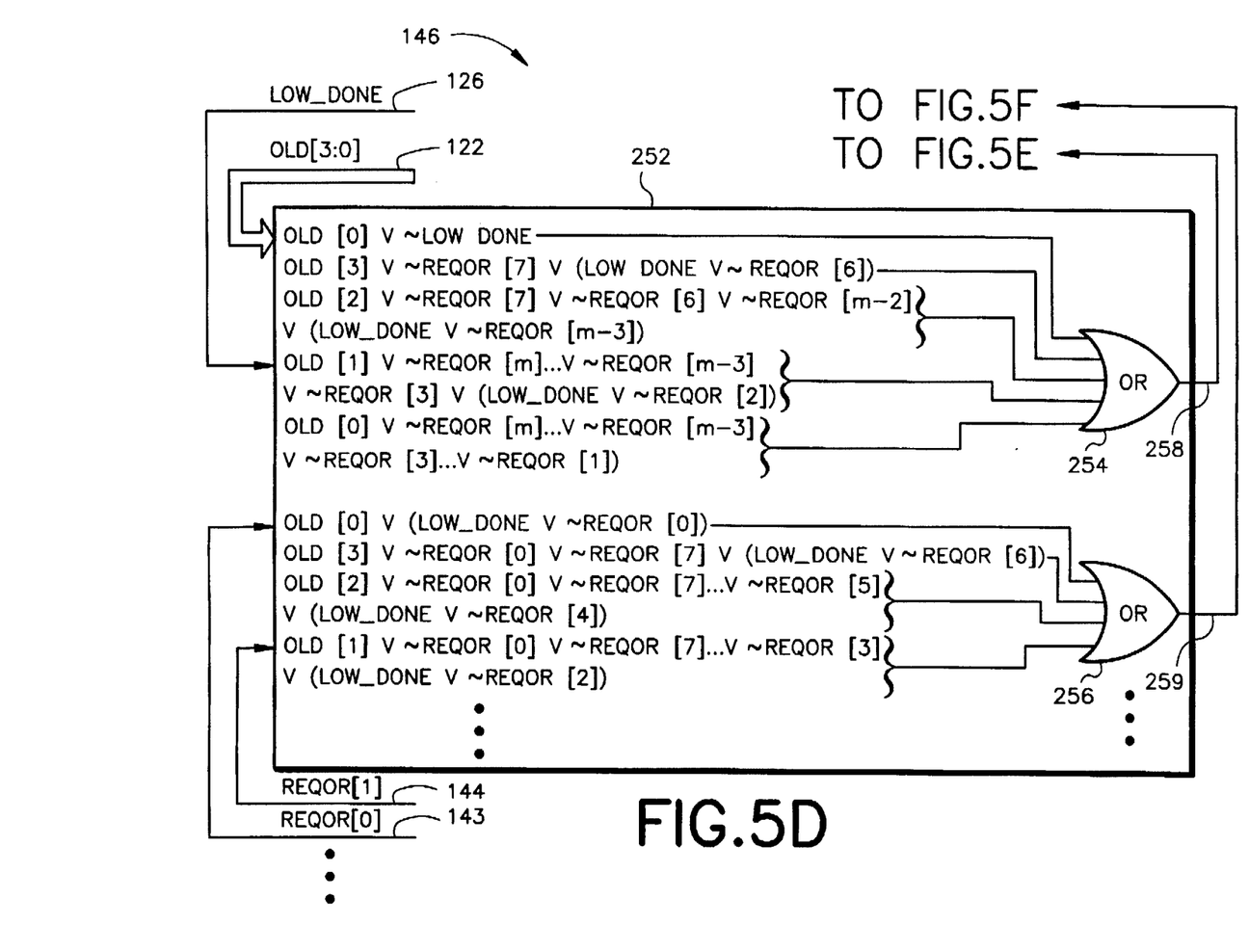
FIG. 5D is a block diagram of the grant decision logic of FIG. 5A.
Figures 5E, 5F:
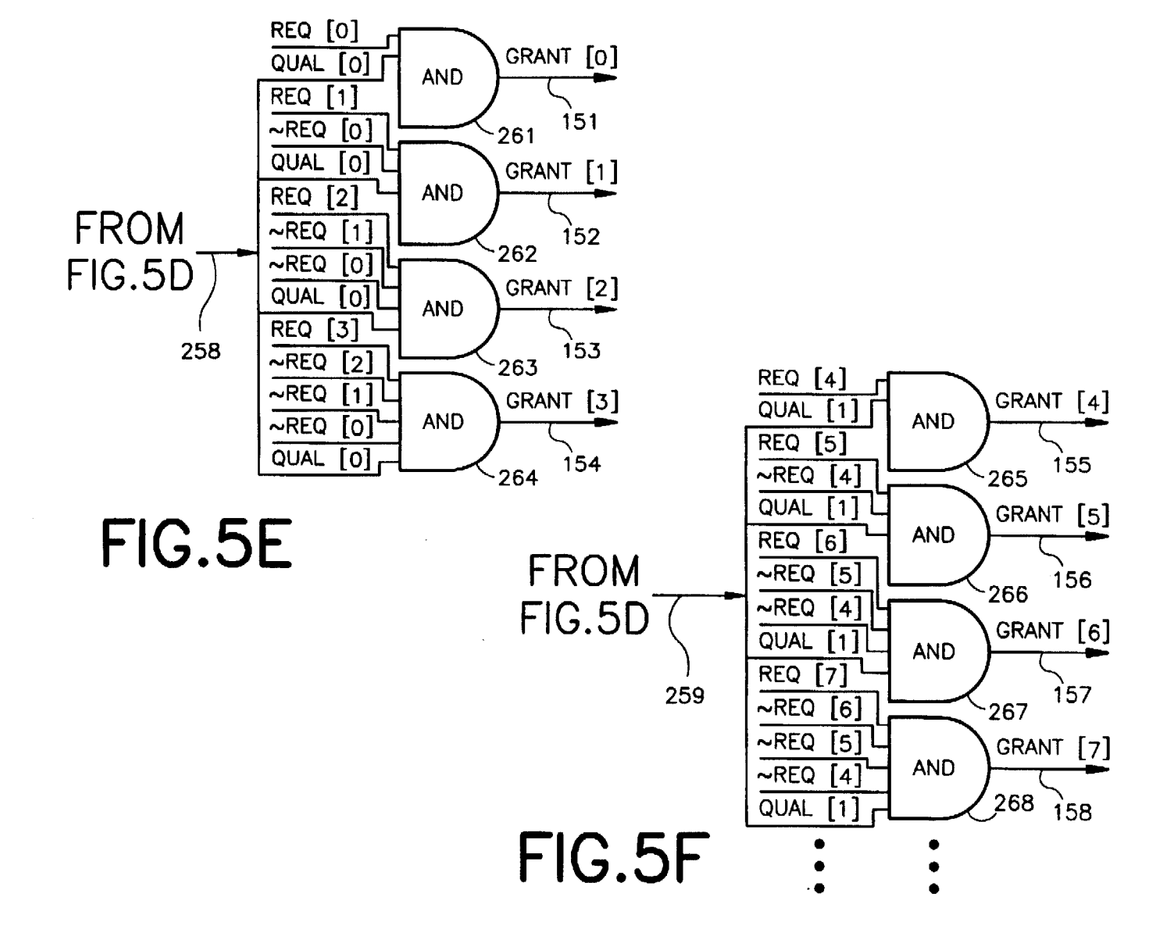

The preferred embodiment for implementing the grant decision logic 146 (FIG. 5A) is set forth in detail in FIG. 5D.

Referring to FIG. 5D, the grant decision logic 146 includes qualify logic 252, which receives the inputs: OLD[3:0], LOW_DONE, and REQOR[6:0]. The qualify logic 252 implements the boolean equations and OR logic 254, 256 as indicated in FIG. 5D upon the aforementioned inputs to generate a series of quality signals QUAL[6:0]. For simplicity, only the boolean equations for the first eight requests REQ[7:0] and their corresponding resultant qualify signals QUAL[1:0] as denoted by reference numerals 158, 159, are shown in FIG. 5D. However, the pattern of boolean equations is repeated. The qualify signals QUAL[6:0] indicate which group of four requests should be focused upon for the next launch grant. Thus, in the case of requests REQ[7:0], the qualify signals QUAL[1, 0] indicate which four (either REQ[7:4] or REQ[3:0]) should be focused upon next to grant a launch.

The grant decision logic 146 further includes a plurality of AND logic mechanisms, only the first eight of which are shown for simplicity, as designated by reference numerals 261–268. The first eight AND logic mechanisms 261–268 evaluate the qualify signals QUAL[1:0], REQ[7:0], and ~REQ[6:0] in order to produce GRANT[7:0].

More specifically, the AND logic 261 receives the qualify signal QUAL[0] and the request REQ[0] and generates therefrom a grant signal GRANT[0], which determines whether or not the first ARBSLOT will launch. The AND logic 262 receives the request REQ[1], ~REQ[0], and QUAL[0] and generates a grant signal GRANT[1], denoted by reference numeral 152, which is forwarded to a corresponding ARBSLOT 48 for determining when the corresponding ARBSLOT 48 is to launch. The AND logic 263 receives the request REQ[2], ~REQ[1], ~REQ[0], and the QUAL[0] and generates therefrom a grant signal GRANT [2], denoted by reference numeral 153, which is forwarded to a corresponding ARBSLOT 48 for determining when the corresponding ARBSLOT 48 is to launch. The AND logic 264 receives REQ[3], ~REQ[2], ~REQ[1], ~REQ[0], and QUAL[0] and generates therefrom a grant signal GRANT [3], denoted by reference numeral 154, which is forwarded to a corresponding ARBSLOT 48 for determining when the corresponding ARBSLOT 48 is to launch. The AND logic 265 receives REQ[4] and QUAL[1] and determines therefrom a grant signal GRANT[4], denoted by reference numeral 155, which is forwarded to a corresponding ARBSLOT 48 to determine when the corresponding ARBSLOT 48 is to launch. The AND logic 266 receives REQ[5], ~REQ[4], and QUAL[1] and determines therefrom a grant signal GRANT[5], denoted by reference numeral 156, which is forwarded to a corresponding ARBSLOT 48 to determine when the corresponding ARBSLOT 48 is to launch. The AND logic 267 receives REQ[6], ~REQ[5], ~REQ[4], and QUAL[1] and generates therefrom a grant signal GRANT [6], denoted by reference numeral 157, which is forwarded to a corresponding ARBSLOT 48 for determining when the corresponding ARBSLOT 48 is to launch. The AND logic 268 receives the REQ[7], ~REQ[6], ~REQ[5], ~REQ[4], and the QUAL[1] and generates therefrom a grant signal GRANT[7], denoted by reference numeral 158, which is forwarded to a corresponding ARBSLOT 48 for determining when the corresponding ARBSLOT 48 is to launch its address.

Many variations and modifications may be made to the preferred embodiment of the invention as described previously. As an example, the queues 38a, 38b in the processor 14 could be replaced by any suitable instruction reordering mechanism, including a reservation station. All such modifications and variations are intended to be included herein within the scope of the present invention, as is defined by the following claims. In the claims hereafter, the structures, materials, acts, and equivalents of all means-plus-function elements and all step-plus-function elements are intended to include any and all structures, materials, or acts for performing the specified functions.

Wherefore, the following is claimed:

1. A system for a computer that executes instructions out of order, comprising:
   a data cache having an odd bank and an even bank;
   a processor configured to concurrently forward addresses to corresponding cache banks during a single processor cycle; said processor comprising;
      an instruction fetch mechanism configured to retrieve instructions;
      a sort mechanism configured to receive instructions from said instruction fetch mechanism and configured to sort said instructions into arithmetic instructions and memory instructions;
      a queue configured to receive said memory instructions from said sort mechanism, said queue having:
         a plurality of address reorder buffer slots, each said address reorder buffer slot configured to maintain an address, to determine whether said address is odd, and to generate a respective odd or even request depending upon whether said address is odd or even; and
         a bank arbitration mechanism configured to receive said odd and even requests respectively and to control said address reorder buffer slots to output odd and even addresses to said data cache.

2. The system of claim 1, wherein said bank arbitration mechanism includes odd and even bank arbitrators that are configured to determine which of said odd and even addresses, respectively, are earliest to be received and configured to cause the earliest odd and even addresses to be forward ed together to said data cache.

3. The system of claim 1, further comprising a means associated with said processor for executing instructions out of order and for receiving said addresses pursuant to said instructions out of order.

4. The system of claim 1, wherein said data cache comprises a plurality of single ported random access memories.

5. The system for enhancing the performance of a computer that executes instructions out of order, the system comprising:
   (a) a data cache having an odd bank and an even bank;
   (b) a processor having;
      (1) an instruction fetch means for retrieving instructions;
      (2) a sort means for receiving instructions from said instruction fetch means and for sorting said instructions into arithmetic instructions and memory instructions:
      (3) a queue means for receiving said memory instructions from said sort means, said queue means having;
         (i) a plurality of address reorder buffer slots, each said address reorder buffer slot configured to maintain an address, to determine whether said address is odd, and to generate a respective odd or even request depending upon whether said address is odd or even; and
         (ii) a bank arbitration means for receiving said odd and even requests respectively and for controlling said address reorder buffer slots to output one of said addresses to each of said banks of said data cache during a single processor cycle.

6. The system of claim 5, wherein said odd and even addresses are forwarded to respective ports of respective single ported storage devices associated respectively with said banks during said single processor cycle.

7. The system of claim 5, further comprising a means associated with said processor for executing instructions out of order and for calculating said data addresses pursuant to said instructions out of order.

8. A method for processing data addresses in a processor and increasing throughput of the data addresses to a data cache from the processor, the method comprising the steps of:
   maintaining a plurality of independent banks in said data cache;
   collecting data addresses in said processor;
   allocating each of said data addresses to a particular one of said banks;
   arbitrating transfer of said addresses to said data cache based upon which of said data addresses have been collected earlier in time; and
   communicating an address to each of said banks during a single cycle of said processor.

9. The method of claim 8, further comprising the steps of:
   sorting said data addresses into odd and even data addresses in said processor; and
   communicating an odd data address and an even data address during said single cycle of said processor.

10. The method of claim 8, further comprising the step of forwarding said addresses to respective single ported storage devices that form said data cache.

11. The method of claim 8, further comprising the step of utilizing a single ported random access memory for each said bank of said data cache.

12. The method of claim 8, further comprising the steps of:
    executing instructions out of order; and
    calculating said data addresses pursuant to said instructions out of order.

13. A system for a computer that executes instructions out of order, comprising:
    a data cache having a plurality of banks;
    a processor configured to concurrently forward addresses to corresponding cache banks during a single processor cycle, wherein said addresses comprise an odd data address and an even data address that are directed to an odd bank and an even bank, respectively;
    an instruction fetch mechanism for retrieving instructions from said instruction cache;
    a sort mechanism configured to receive instructions from said instruction fetch mechanism and configured to sort said instructions into arithmetic instructions and memory instructions;
    a memory queue configured to receive said memory instructions from said sort mechanism, said memory queue having:
       a plurality of address reorder buffer slots, each said address reorder buffer slot configured to maintain an address, to determine whether said address is odd or even, and to generate a respective odd or even request depending upon whether said address is odd or even; and
       odd and even bank arbitrators configured to receive said odd and even requests respectively and to control said address reorder buffer slots to output data to said data cache.

14. The system of claim 13, further comprising a means associated with said processor for executing instructions out of order and for receiving said addresses pursuant to said instructions out of order.

15. The system of claim 13, wherein said data cache comprises a plurality of single ported random access memories.

16. The system of claim 13, wherein said odd and even bank arbitrators are configured to determine which of said odd and even addresses, respectively, are earliest and configured to cause the earliest odd and even addresses to be forwarded together to said data cache.

17. A system for enhancing the performance of a computer that executes instructions out of order by increasing throughput of data addresses from a processor to a data cache, the system comprising:

a plurality of banks in said data cache;

first means associated with said processor for collecting data addresses;

second means associated with said processor allocating each of said data addresses to a particular bank; and third means associated with said processor for concurrently communicating one of said addresses to each of said banks during a single processor cycle, wherein said plurality of banks comprises an odd band and an even bank;

wherein said second means sorts said data addresses into odd and even data addresses; and wherein said third means forwards said odd and even addresses to said odd and even banks, respectively, from said processor during said single processor cycle;

an instruction cache;

an instruction fetch mechanism for retrieving instructions from said instruction cache;

a sort mechanism configured to receive instructions from said instruction fetch mechanism and configured to sort said instructions into arithmetic instructions and memory instructions;

a memory queue configured to receive said memory instructions from said sort mechanism, said memory queue having:

a plurality of addresses reorder buffer slots, each said address reorder buffer slot configured to maintain an address and including said second means for determining whether said address is odd or even and for generating respective odd or even requests depending upon whether said address is odd or even; and odd and even back arbitrators associated with said third means, said odd and even bank arbitrators configured to receive said odd and even requests respectively and to control said address reorder buffer slots to output data to said data cache.

18. The system of claim 17, wherein said odd and even addresses are forwarded to respective parts of respective single ported storage devices associated respectively with said banks during said single processor cycle.

19. The system of claim 17, further comprising a means associated with said processor for executing instructions out of order and for calculating said data addresses pursuant to said instructions out of order.

* * * * *